June 14, 1960 R. K. JOHANSON 2,940,462
PRESSURE REGULATING VALVE
Filed March 13, 1957
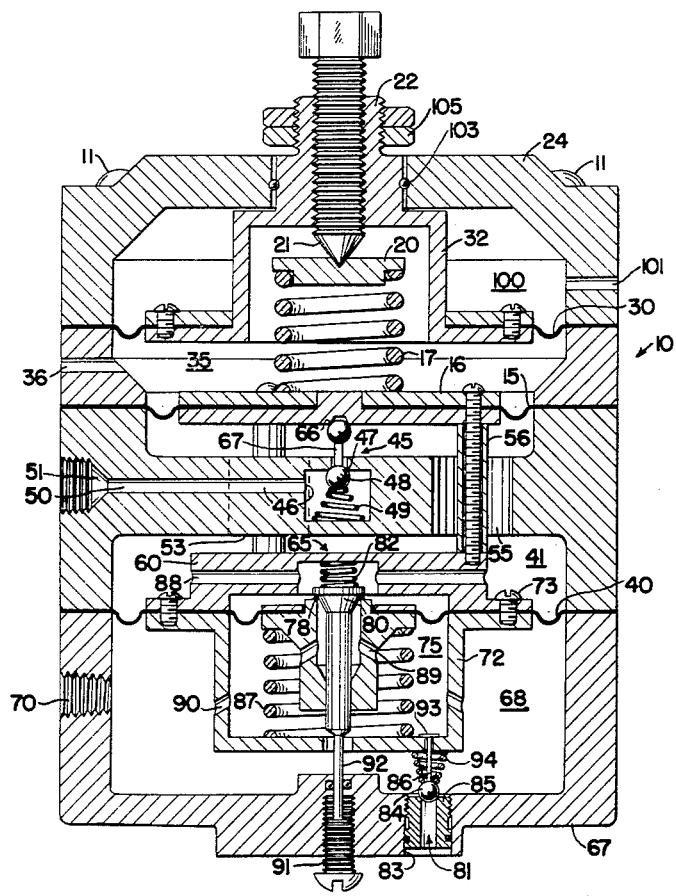
INVENTOR.
ROY K. JOHANSON
BY Joseph E Ryan
ATTORNEY

2,940,462
PRESSURE REGULATING VALVE

Roy K. Johanson, Milwaukee, Wis., assignor to Minneapolis-Honeywell Regulator Company, Minneapolis, Minn., a corporation of Delaware Filed Mar. 13, 1957, Ser. No. 645,764

9 Claims. (Cl. 137—116.3)

My invention relates to pressure regulators for a flow of fluid and more particularly to an improved pressure regulator designed to compensate for drop therein to provide a constant pressure at the outlet side of said valve independent of flow therethrough.

Pressure regulating valves of this general type are known, but most of the prior devices have been too complex in nature and require too many auxiliary valves and mechanisms to make for a compact simplified flow regulating valve.

It is therefore an object of this invention to provide a simplified pressure regulating valve which would compensate for drop therein due to flow to provide a value of pressure at the outlet side or if desired a rising value in outlet pressure with flow.

It is also an object of this invention to provide an improved pressure regulating valve which will maintain a constant pressure at a distance remote from said regulator independent of demand which requires no further connections than inlet and outlet conduits.

A further object of this invention is to provide an improved pressure regulating valve including a primary pressure sensor operating a valve and a velocity or flow sensor coupled thereto reset the valve and compensate for drop therein.

A further object of this invention is to provide an improved pressure regulating valve with means for remotely shifting the set point of the valve to a second set pressure for the valve.

These and other objects of this invention will become apparent from a reading of the attached description and the drawing.

My improved pressure regulating valve shown herein is comprising a multipart casing indicated generally at 10 which is held together through suitable means such as screws or nuts and bolts indicated at 11. Included in the casing or between the parts thereof is a first diaphragm 15 which will be hereinafter identified as the regulating diaphragm having a plate 16 secured thereto with a main adjusting biasing spring 17 bearing against the same. Spring 17 is held at its opposite extremity by a spring support 20 against which is positioned an adjusting screw 21 threaded through a sleeve member 22, the purpose of which will be later identified, and sealed in an end wall part 24 of the casing. Positioned above the regulating diaphragm 15 in the drawing is a second diaphragm 30 which is held in position between the parts of the casing and has attached thereto a cup-shaped thrust member 32 which is attached to or integral with the support 22 housing the adjusting screw 21 for the spring 17. The diaphragm 30 or reset diaphragm together with the regulating diaphragm 15 defines an atmospheric chamber 35 which is vented through the casing as at 36 to the atmosphere.

Casing 10 also includes a third diaphragm 40 which is positioned between the parts thereof and defining with the regulating diaphragm 15 a chamber indicated at 41. As will be later noted, chamber 41 receives the regulated yet uncompensated air pressure which is applied against the upper surface of the diaphragm 40 within the chamber 41 and is also applied against the under surface of the diaphragm 15 or the regulating diaphragm to act against the force of the spring 17 to control the operation of the regulator. Positioned within the chamber 41 is the valve means 45 having an inlet portion 46 and a cooperating valve seat 47 with a ball-type valve plug 48 which is biased against the seat through action of a spring 49. The inlet portion of the valve 46 is connected through a passage indicated at 50 to an inlet conduit 51 in the casing 10 to which inlet high pressure air is applied. The conduit 50 and valve parts 46–49 are included in a center portion of the casing indicated at 53 which bridges the chamber 41 and locates the valve centrally within the chamber, the bridging or center section 53 having a number of apertures 55 therein through which connection means 56 extend for the purpose of connecting the plate 16 on diaphragm 15 with an internal housing member 60 for a second valve indicated at 65 and associated with diaphragm 40, the purpose of which will be later defined. Included with valve plug 48 is an engaging member 66 which is connected to plug 48 by shaft 67. Inlet air pressure is directed from the port 51 through the conduit 50 to the inlet portion 46 of the valve 45 and upon movement of the diaphragm 15 downward relative to the center section 53 of the casing, engaging member 66 moves the ball 48 away from the seat 47 allowing inlet air pressure to enter the chamber 41. Upon movement of the diaphragm upward and away from the center section 53 of the casing, the plug member 48 will be moved toward the seat member 47 to close valve 45.

Diaphragm 40 defines with the end section of the casing indicated at 67 the third chamber 68, through which an outlet conduit 70 in the wall of the casing extends in communication therewith. Housing member 60 attached to the diaphragm 40 and through the connecting rods 56 to the diaphragm 15 also includes a support 72 secured to the diaphragm 40 and member 60 by means of screws such as 73 to define with the connecting member 60 a chamber 75 in which the valve 65 is located and through which a part of the diaphragm 40 extends. Attached to this inner portion of the diaphragm 40 is a valve seat member 78 which is secured to the diaphragm through suitable means not shown. Cooperating with the valve seat 78 is a tapered or characterized plunger or plug member 80 which has a small bias spring 82 bearing against the same and the surface of the connecting member 60 to urge the valve plug onto the seat 78. A biasing spring 87 positioned between the housing member 72 and the valve seat urges the valve seat and the diaphragm upward. Passageway 88 in the connecting member 60 allows the pressure within the chamber 41 to communicate with the upper surface of the valve seat and similar passages 89 in the valve seat allow the air pressure passing through the valve seat to the interior of the support member 72 which includes apertures 90 therein communicating with the chamber 68 at the outlet side of the regulator. An adjustment mechanism including a screw 91 and a post 92 sealed in the end section of the casing 67 bear against the stem of the plunger 80 to adjust the position of the plunger relative to the valve seat.

Also included in casing 67 is an aperture 83 in which is positioned a valve 81 having a plug 84 cooperating with a seating surface or seating member 85 threaded into aperture 83 in casing 67 to form an outlet or relief valve for the regulator. Plug 84 has a stem 86 which is loosely fitted through the support 72 and has a head 93 which is engaged by the support 72 upon upward movement of the support to lift the plug 84 from the seat member 85 opening the relief valve. A spring 94 is positioned between the support 72 and the plug 84 encircling stem 86 to urge the plug 84 toward the seat member 85 in a conventional manner.

Since the diaphragms 15 and 40 are connected through the connection member 56, they will move together and hence the valves 45 and 81 will act in a manner similar to a conventional three position valve. That is, whenever the diaphragms 15 and 40 are moved downward, the valve 45 will open and the valve 81 will remain closed allowing inlet air pressure to be fed to chamber 41 and ultimately to chamber 68 and the outlet side of the regulator. With upward movement of the diaphragms 40 and 15 from a neutral position in which both valves are closed, the valve 81 will open allowing the chamber 68 to be vented to the atmosphere. In this manner, the high pressure chamber 68 will not be allowed to lock up the regulator. It will be noted that an increase in pressure in chamber 68 will act on the under surface of the diaphragm 40 to close the valve 65 and if the relief port were not included in chamber 68, it would be possible to prevent an exhaust of pressure in the regulator whenever the outlet pressure became more than the desired setting of the regulator.

Considering the regulator mechanism as described thus far, it will be seen that the flow which is demanded of the system with which the regulator is associated determines the pressure drop across the diaphragm 40. This pressure drop will vary with the flow in a manner prescribed by the spring rate of the spring 87 and the contour of the contour plug 80. This pressure drop acting on the diaphragm 40 gives rise to a force which is fed back to the main regulating section by means of the connecting rod 56. This force acting with the force already exerted on the main regulating section by the spring 17 acts to raise the pressure in chamber 41 to a level that is adequately high to compensate for the normal drop through the main regulating section as well as the drop that is obtained across the diaphragm 40. The pressure in chamber 68 or the outlet pressure can be made to vary in any prescribed manner with flow depending upon the relationship between the areas of the diaphragms 40 and 15, the contour of the contour plug and the spring rate of the spring 87. Thus in a given regulator, these values will be fixed and the degree of compensation of the regulator is fixed. While it is possible that the flow pressure curve for the regulator might be slightly altered with a change in level of the pressure in the chambers 68 and 41 caused by the density of the air, and hence the degree of motion of the contour plug relative to the seat, the changes in pressure in the chambers 41 and 68 are only over a small range and hence the compensation of the regulator is substantially fixed. It should be recognized, however, that with this regulator an output regulated pressure is obtained and remains fixed or rises in a manner determined by the factors outlined above which manner or characteristic may be altered by a modification in these components.

The purpose of the adjustment screw 91 is to position the contour plug 80 so that it is just touching the seat 78 when the spring 87 is just at its free length. Under these conditions, the pressure in chamber 68 will rise smoothly from zero flow. Should the counter plug be too far off its seat, there will be a delay experienced during the first few units of flow through the regulator before the compensating characteristic begins. This results from the fact that compensation requires that a pressure drop be obtained across the diaphragm 40 which does not occur unless the spring 87 is exerting some force as in the initial flow where the plug is not properly seated. Conversely, if the plug is adjusted so that the spring 87 is exerting some force at zero flow then there will be a bump or sudden rise in the pressure in the chamber 68 as the flow changes from zero to some increment of flow before the normal compensating characteristic is obtained. While this adjustment screw is shown external of the casing 67, it will be recognized that it could and will probably be included as an internal adjustment.

For the purpose of resetting the set point of the regulator from a remote point, the diaphragm 30 or reset diaphragm defines with the end of the casing 24 the reset chamber 100 into which a control air pressure may be introduced through a conduit 101 for the purpose of resetting the adjustment of the spring tension. The guide member 22 mounting the adjusting screw 21 which cooperates with the plate 20 is slidably mounted within the casing part 24 and an O-ring seal 103 is utilized to seal this portion of the chamber. Threaded on the outer portion of the sleeve 22 is a nut or stop member 105 which determines the high pressure adjustment of the spring by limiting the amount of movement the sleeve 22 may move relative to the casing and hence the cup-shaped support 32 may move the member 20 and hence the end of the spring 17. The adjusting screw 21 adjusts the low pressure adjustment of the spring or the regulator in a conventional manner.

The operation of the main portion of the regulator is conventional, that is the operation of bias spring 17 against the diaphragm 15 controls the valve 45 to control the amount of air fed from the inlet to the interior of chamber 41 in accordance with the setting of the spring 17. Flow through the valve and through the valve 65 creates a differential pressure across the diaphragm 40 which is connected to the diaphragm 15 to reset the regulator and compensate for drop. The adjusting knob 21 adjusts the spring tension 17 to determine the low pressure adjustment for the regulator in a conventional manner. Similarly the adjustment of nut 105 relative to the sleeve 22 determines the movement of the sleeve and hence the bracket 32 to adjust the end position of the spring and determine the high pressure adjustment of the regulator. Remote adjustment of the regulator to a previously set second pressure is accomplished by feeding through the conduit 101 a pressure sufficiently high to overcome the force of spring 17 and move the bracket 32 to the adjustment stop 105. While we have shown the pressure source 101 as external from the main control, the pressure from the chamber 68 or any point in the outlet line could be used for this purpose through some switching mechanism if the area of the diaphragm 30 were large enough. Although not shown a reset could be accomplished by a remote electrical device.

While I have disclosed my regulator in connection with this specific embodiment, the scope of the invention should be determined only by the appended claims.

I claim:

1. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing and the interior of said second chamber, means connecting with said valve means to said first diaphragm for operation therewith, means connecting said first and second diaphragms together, a third chamber defined by said second diaphragm and an end of said casing, a passage between said third and second chambers, valve means positioned in said passage and operated by movement of said second diaphragm, an outlet conduit in said casing connected to said third chamber, additional conduit means in said third chamber venting it to atmosphere, and valve means positioned in the additional conduit means and connected to said second diaphragm to be operated thereby, said first and last named valve means opening respectively on opposite directions of movements of said diaphragms from a reference position.

2. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, valve means positioned in said passage and operated by movement of said second diaphragm, an outlet conduit in said casing connected to said third chamber, additional conduit means in said third chamber venting it to atmosphere, valve means positioned in the additional conduit means and connected to said second diaphragm to be operated thereby, said first and last named valve means opening respectively on opposite directions of movements of said diaphragms from a reference position, and adjustment means mounted in said casing and contacting said spring means to adjust the position of the end of said spring remote from said diaphragm to reset the regulator.

3. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, valve means positioned in said passage and operated by movement of said second diaphragm, an outlet conduit in said casing connected to said third chamber, additional conduit means in said third chamber venting it to the atmosphere, valve means positioned in the said additional conduit means and connected to said second diaphragm to be operated thereby, said first and last named valve means opening respectively on opposite directions of movements of said diaphragms from a reference position, and means including a third diaphragm and positioned between the end of said spring means and said casing, passage means through said casing and permitting the entrance of an air pressure behind said third diaphragm to adjust the position of said spring means relative to said casing and said first diaphragm to adjust the set point of said regulating valve.

4. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, second valve means positioned in said passage and connected to said second diaphragm to be operated by the differential pressure between said second and third chambers, an outlet port means positioned in said casing and connected to said third chamber, additional conduit means in said third chamber venting it to the atmosphere, and valve means positioned in said additional conduit means and connected to said second diaphragm to be operated thereby, said first and last named valve means opening in a reverse sense upon movement of said diaphragms.

5. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing, and the interior of said second chamber, means connecting said valve means to said first diaphragm for operation therewith, means connecting said first and a second diaphragms together, a third chamber defined by said second diaphragm and an opposite end of said casing, a passage between said third and second chambers, second valve means positioned in said passage and connected to said second diaphragm to be operated by the differential pressure between said second and third chambers, said second valve means having a non-linear rising flow characteristic which offsets the drop in said regulating valve, outlet means positioned in said casing and connecting to said third chamber, additional conduit means in said third chamber venting it to atmosphere, and valve means positioned in the additional conduit means and connected to said second diaphragm to be operated thereby, said first and last named valve means opening respectively on opposite directions of movements of said diaphragms from a reference position.

6. A pressure regulating valve comprising, a casing, a main regulating diaphragm positioned in said casing and forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, variable orifice means positioned in said passage and connected to said second diaphragm to be operated by the pressure differential between the second and third chambers, an outlet port means positioned in said casing and connected to said third chamber, additional conduit means in said third chamber venting it to atmosphere, and valve means positioned in said additional conduit means and connected to said second diaphragm to be operated thereby, said first and last named valve means opening respectively on opposite directions of movements of said diaphragms from a reference position.

7. A pressure regulating valve comprising, a casing, a main regulating diaphragm positioned in said casing and defining forming one wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing the interior of said second chamber, means connecting said valve means to said first diaphragm for operation therewith, means connecting said first and second diaphragms together, a third chamber defined by said second diaphragm and an end of said casing, a passage between said third and second chambers, valve means positioned in said passage and operated by movement of said second diaphragm, an outlet conduit in said casing connected to said third chamber, additional conduit means in said third chamber venting it to atmosphere, valve means positioned in said additional conduit means and connected to said second diaphragm to be operated thereby, said first and last named valve means opening respectively on opposite directions of movements of said diaphragms from a reference position, a reset diaphragm positioned between an end of said spring of said first chamber and the other end wall of said casing and defining a fourth chamber, and conduit means connected through said casing to said fourth chamber and adapted to have a reset pressure impressed therein to modify the adjustment of said spring.

8. A pressure regulating valve comprising, a casing, a main regulating diaphragm positioned in said casing and defined forming one wall of a first chamber, means connecting said first chamber to atmosphere, a spring biasing member positioned in said first chamber and adapted to apply a force against said diaphragm, a second diaphragm positioned in said casing and defining with said first diaphragm a second chamber, valve means mounted on said casing and positioned in said second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, valve means positioned in said passage and operated by movement of said second diaphragm, an outlet conduit in the casing connected to said third chamber, additional conduit means in said third chamber venting it to atmosphere, valve means positioned in said additional conduit means and connected to said second diaphragm to be operated thereby, said first and last named valve means opening respectively on opposite directions of movements of said diaphragms from a reference position, and means included in said casing and cooperating with said spring for remotely adjusting the setting of said regulator through a pneumatic pressure from a point remote from said regulator.

9. A pressure regulating valve comprising, a casing, a main regulating diaphragm positioned in said casing and forming a wall of a first chamber, means connecting said first chamber to atmosphere, a spring biasing member positioned in said first chamber and adapted to apply a force against said diaphragm, a second diaphragm positioned in said casing and defining with said first said diaphragm a second chamber, valve means mounted on said casing and positioned in said second chamber, said valve means including inlet and outlet ports connected respectively to an inlet air conduit in said casing and the interior of said second chamber, means connecting said valve means to said first diaphragm for operation therewith, means connecting said first and second diaphragms together, a third chamber defined by said second diaphragm and an end of said casing, a passage between said third and second chambers, variable orifice means positioned in said passage and connected to said second diaphragm to be operated by the pressure differential between said second and third chambers, and outlet means connected to said third chamber, the variable orifice operating to vary the flow through said second diaphragm applying a force on said first diaphragm to operate said valve means to reduce the pressure differential.

References Cited in the file of this patent
UNITED STATES PATENTS

| | | |
|---|---|---|
| 2,490,113 | Campbell | Dec. 6, 1949 |
| 2,707,966 | Taplin | May 10, 1955 |
| 2,761,464 | Faust | Sept. 4, 1956 |
| 2,806,481 | Faust | Sept. 17, 1957 |